(12) United States Patent
Hebig et al.

(10) Patent No.: US 9,317,802 B2
(45) Date of Patent: Apr. 19, 2016

(54) DETECTING WATER INTRUSION IN ELECTRONIC DEVICES

(71) Applicant: GLOBALFOUNDRIES INC., Grand Cayman (KY)

(72) Inventors: Travis R. Hebig, Rochester, MN (US); Joseph Kuczynski, Rochester, MN (US); Steven R. Nickel, Rochester, MN (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 148 days.

(21) Appl. No.: 13/966,529

(22) Filed: Aug. 14, 2013

(65) Prior Publication Data

US 2015/0048154 A1    Feb. 19, 2015

(51) Int. Cl.
*G06K 19/06* (2006.01)
*G06K 19/077* (2006.01)
*G06Q 30/00* (2012.01)

(52) U.S. Cl.
CPC ........ *G06K 19/07798* (2013.01); *G06Q 30/012* (2013.01); *Y10T 29/49128* (2015.01)

(58) Field of Classification Search
CPC .................................................. H01L 2924/14
USPC ........................................................ 235/492
See application file for complete search history.

(56) References Cited

U.S. PATENT DOCUMENTS

| | | | |
|---|---|---|---|
| 4,532,419 A * | 7/1985 | Takeda | 235/492 |
| 7,091,864 B2 * | 8/2006 | Veitch et al. | 340/572.8 |
| 7,492,326 B1 * | 2/2009 | Bodlovic et al. | 343/873 |
| 8,026,152 B2 * | 9/2011 | Yamazaki et al. | 438/458 |
| 2010/0025238 A1 | 2/2010 | Gottlieb et al. | |
| 2010/0078489 A1* | 4/2010 | Winkler | 235/493 |
| 2011/0109333 A1 | 5/2011 | Porjo et al. | |
| 2012/0038374 A1 | 2/2012 | Johnson | |
| 2012/0139565 A1 | 6/2012 | Ambuter | |

FOREIGN PATENT DOCUMENTS

| | | | |
|---|---|---|---|
| JP | 2011232922 A | 11/2011 | |
| WO | 2007047887 A2 | 4/2007 | |
| WO | WO2013144420 A1 * | 10/2013 | |

OTHER PUBLICATIONS

Joseph Stromberg for Smithsonian.com, Sep. 27, 2012, http://www.smithsonianmag.com/science-nature/scientists-invent-electronic-circuits-that-dissolve-in-water-53044512/?no-ist.*

Hughes, N., "Apple Looking to Improve Water Sensors for Detecting iPhone Damage," htttp://appleinsider.com., Feb. 17, 2012, 3:53 p.m.

Hwang, S. et al., "Supplementary Materials for a Physically Transient Form of Silicon Electronics," www.sciencemag.org.cgi/content/full/337/6102/1640/DCI, Sep. 28, 2012, Science 337, 1640 (2012), DOI: 10.1126/science.1226325, Materials and Methods, Figs. S1 to S22, References 19-32.

(Continued)

*Primary Examiner* — Jamara Franklin
(74) *Attorney, Agent, or Firm* — Thompson Hine, LLP

(57) ABSTRACT

A device includes a device casing and a water-soluble circuit located within the device casing. An identification code is encoded on the circuit. The identification code is associated with the device.

20 Claims, 3 Drawing Sheets

(56) References Cited

OTHER PUBLICATIONS

Li, R. et al., "An Analytical Model of Reactive Diffusion for Transient Electronics," www.MaterialViews.com, Advanced Functional Materials 2013, www.afm-journal.de, DOI: 10.1002/adfm.201203088, Wiley-VCH Verlag GmbH & Co. KGaA, Weinheim, wilelyonlinelibrary.com.

Swanson, P. "Apple Looking to Improve Water Damage Detection with New Patent," http://modmyi.com/content/6951, Feb. 17, 2012, 8:10 p.m.

* cited by examiner

DETECTING WATER INTRUSION IN ELECTRONIC DEVICES

FIELD OF THE INVENTION

The present disclosure relates to the field of electronic devices and more particularly to detecting water intrusion in portable electronic devices.

BACKGROUND

Portable electronic devices can suffer damage due to exposure to water. Many warranties for portable electronic devices do not cover water damage to the device. Portable electronics manufacturers and retailers often receive devices for warranty repair or replacement that have suffered water damage.

SUMMARY

Disclosed herein are embodiments of an electronic device. The electronic device includes a device casing and a water-soluble circuit located within the device casing. An identification code is encoded on the circuit. The identification code is associated with the device.

Also disclosed herein are embodiments of a method for manufacturing an electronic device. The method includes installing a water-soluble circuit within a casing of an electronic device. The water-soluble circuit has an identification code encoded on it. The identification code is associated with the device.

Also disclosed herein are embodiments of a method for detecting water intrusion in an electronic device. The method includes installing a water-soluble circuit within a casing of an electronic device. The circuit is encoded with a first identification code. The first identification code is associated with the electronic device. The method further includes placing the first identification code into a database.

DETAILED DESCRIPTION

Figure 1:
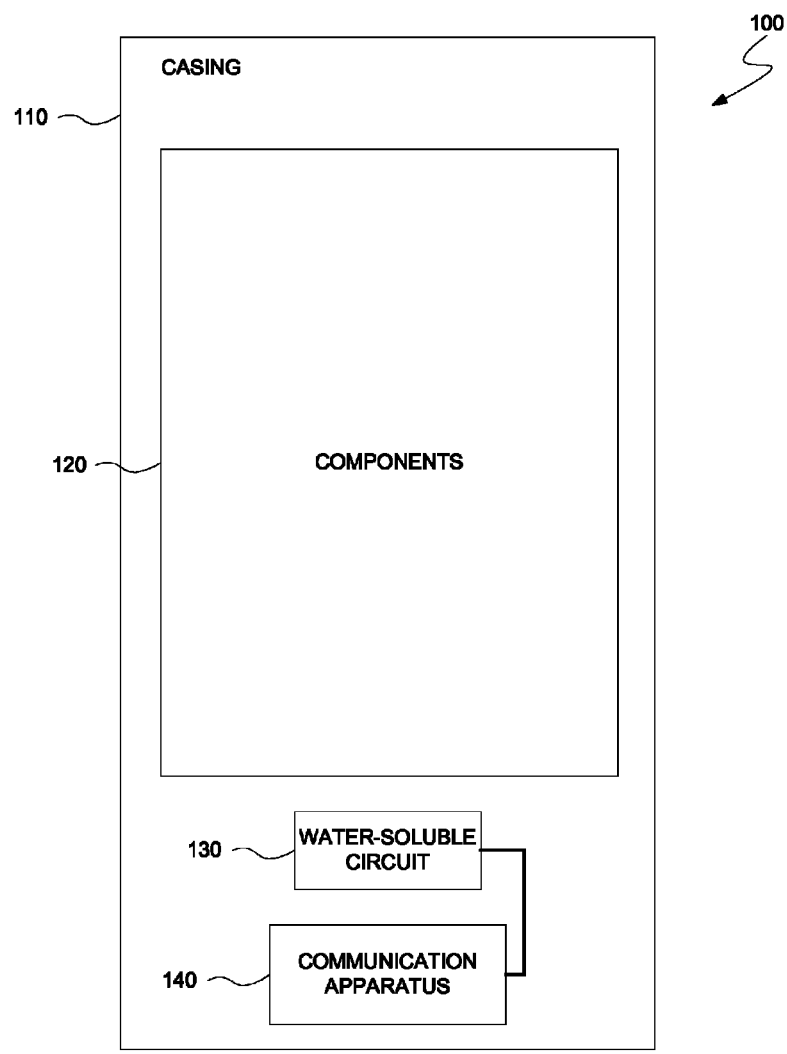
FIG. 1 depicts a block diagram of an example electronic device.

The ability to detect water damage is important for determining if a warranty on an electronic device is void when the warranty does not cover water damage. It is helpful if there is a way to detect water damage which can be done easily and with little training such that individuals such as retail representatives may be able to determine if a device was damaged by water. One way to detect water damage is to place contact indicators within the device which change color when exposed to water. Another method involves the use of water-soluble conductive glue on a capacitor. However, it may be possible to replace the contact indicators or water-soluble conductive glue if they are exposed to water.

Embodiments of the current invention may provide a device and method for detecting water intrusion in an electronic device using water-soluble circuits. These water-soluble circuits are sometimes referred to as transient electronic circuits. A water-soluble circuit may be encoded with an identification code and placed within an electronic device. The identification code may be associated with the device. The identification code may be stored on a database where it can be retrieved later. When the device is brought in for replacement or repair under a warranty, the identification code can be read off the water-soluble circuit and compared to the identification code stored in the database. If the numbers do not match, the device may have been tampered with to hide that the water-soluble circuit had dissolved. If a number cannot be read off of the water-soluble circuit, it may be inferred that the circuit has dissolved due to exposure to water.

Water soluble circuits and methods for creating water soluble circuits are known in the art. Any method for creating the water soluble circuit may be used. An example water-soluble circuit contains a silicon nanomembrane for the semiconductors, magnesium for the conductors, magnesium oxide and silicon dioxide for the dielectrics, and silk for the substrate and packing materials. However, the water-soluble circuit may be made of any materials which may dissolve in water. An example water-soluble circuit may further contain an encapsulation layer which may impact the rate of dissolution of the circuit.

The water-soluble circuit may be a non volatile memory circuit encoded with an identification code. The identification code may be unique to the device in which it is placed or may correspond to the device more generally. In some embodiments, the identification code will be unique such that the circuit will have an identification code which corresponds to the particular device in which it is placed. For example, the identification code may be a random number or a mix of numbers and characters which is not found elsewhere on the device and is unique to the device. In another example, the identification code may be the device's serial number. In some embodiments, the identification code may correspond more generally to the device in which it is placed. For example, the identification code may correspond to the type of device or it may be the model number of the device.

The water-soluble circuit may be located within the casing of an electronic device. The casing can be any structure which contains components of the device. The casing may contain all the components of the device or some subset of the components. Additionally, the casing may contain a communication apparatus which may be connected to the water-soluble circuit. The communication apparatus may be designed to transmit the identification code from the circuit to an external device. In some embodiments, the water-soluble circuit may be connected to one or more of the components of the device and the components may transmit the identification code to an external device. In some embodiments the water-soluble circuit may not be connected to a communication apparatus. In some embodiments the identification code may be read off the water-soluble circuit using a probe.

When the device is brought in for replacement or repair under a warranty, the device may be checked for water damage. The electronic device may be any electronic device. Example devices include a mobile phone, a laptop, a tablet, or an audio player. The identification code may be read off the device and compared to the identification code which was originally stored on the water-soluble circuit. The original identification code may have been stored in a database and may be retrieved from the database for comparison with the identification code read off the device. It may be determined that the device has been exposed to water if the identification code read off the device is not identical to the identification code stored in the database. The identification codes may be different because the water-soluble circuit has been replaced. Alternatively, the identification codes may be different because there was no identification code read off the device.

In both instances, it may be assumed that the water-soluble circuit dissolved in water and the warranty for the device is void for water damage.

Referring now to FIG. 1, a block diagram of an electronic device 100 according to an embodiment of the invention is depicted. Device 100 may be any type of electronic device such as a mobile phone, a laptop, a tablet, an audio player, or a gaming system. A casing 110 may contain components 120 of device 100. Casing 110 may be any material or any structure which contains components 120. Components 120 may include one or more of the components which perform the functions of device 100.

A water-soluble circuit 130 is located within casing 110. Water-soluble circuit 130 is encoded with an identification code. The identification code may be unique to device 100 or may correspond to device 100 more generally. In some embodiments, the identification code will be unique such that the circuit will have an identification code which corresponds only to device 100. For example, the identification code may be a random number or a mix of numbers and characters which is not found elsewhere on device 100 and corresponds only to device 100. In another example, the identification code may be the serial number of device 100. In some embodiments, the identification code may correspond more generally to device 100. For example, the identification code may correspond to the type of device or it may be the model number.

A communication apparatus 140 is optionally connected to water-soluble circuit 130. Communication apparatus 140 may be configured to transmit the identification code from water-soluble circuit 130 to an external device. In some embodiments, communication apparatus 140 may be a part of components 120 and perform other functions for device 100.

Figure 2:
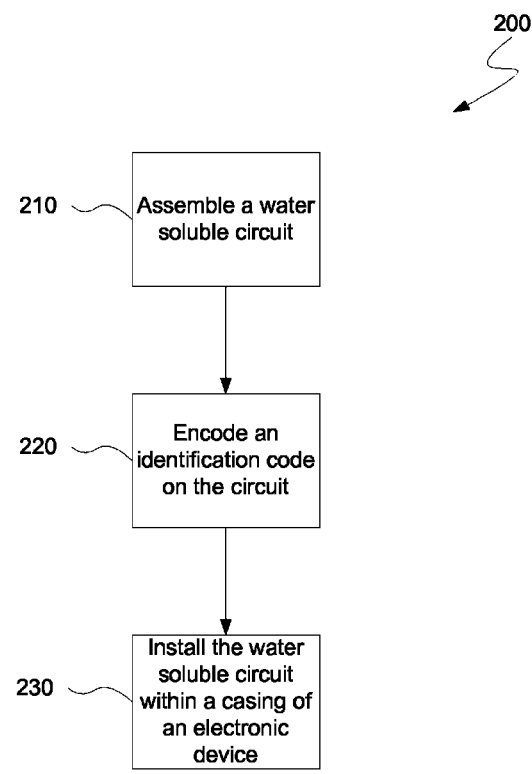
FIG. 2 is a flow diagram for an example method for manufacturing an electronic device.

Referring now to FIG. 2, a flow diagram 200 illustrating an example embodiment of a method for manufacturing an electronic device is shown. At step 210, a water-soluble circuit is assembled. At step 220, an identification code is encoded on the water-soluble circuit. In some embodiments steps 210 and 220 may be performed simultaneously such that the circuit is assembled with the identification code encoded on it. At step 230, the water-soluble circuit is installed within a casing of an electronic device. The water-soluble circuit may be installed anywhere within the casing. In some embodiments the water-soluble circuit may be installed near components of the device that are most susceptible to water damage. Installation may include placing the circuit, securing the component within the casing, and connecting the circuit to a communication apparatus or any other components. In some embodiments, the water-soluble circuit will not be connected to a communication apparatus or any other components.

Figure 3:
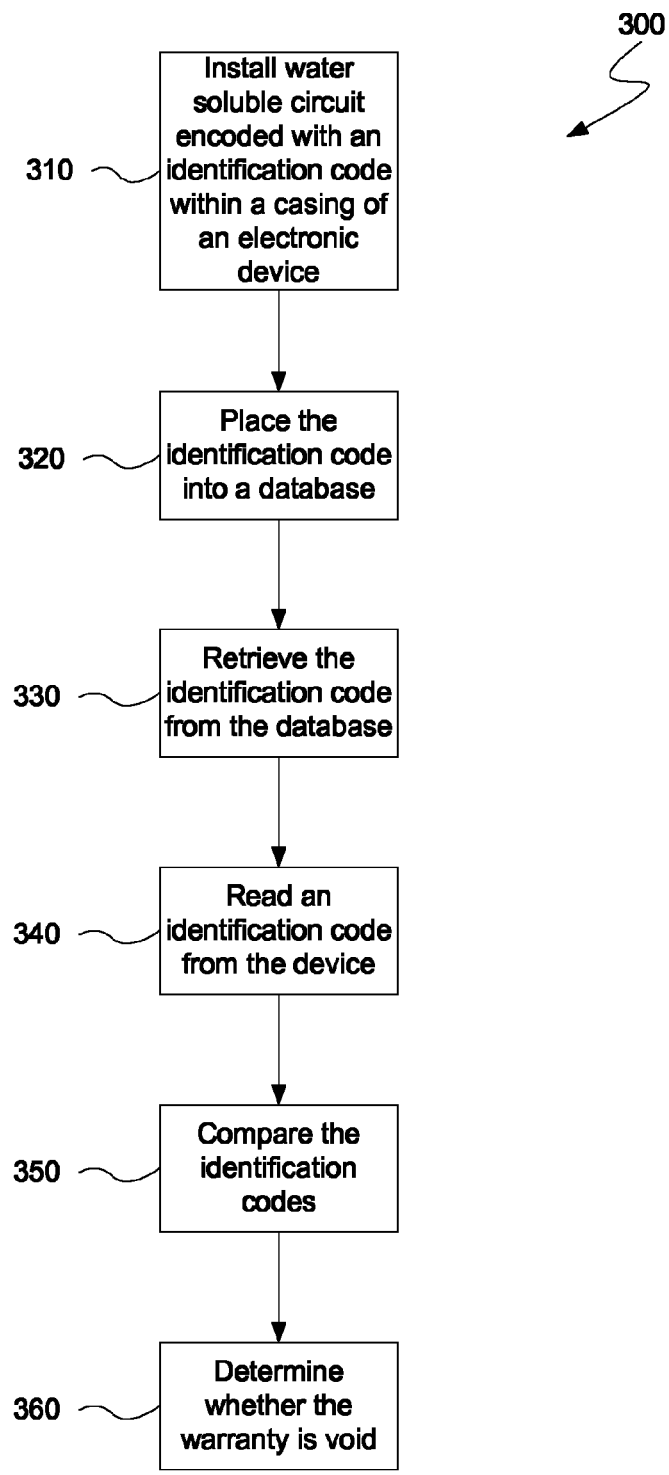
FIG. 3 is a flow diagram for an example method for detecting water intrusion in an electronic device.

Referring now to FIG. 3, a flow diagram 300 illustrating an example embodiment of a method for detecting water intrusion in an electronic device is shown. At step 310, a water-soluble circuit encoded with an identification code is installed in an electronic device. The water-soluble circuit may be installed anywhere within the casing. In some embodiments the water-soluble circuit may be installed near components of the device that are most susceptible to water damage. Installation may include placing the circuit, securing the component within the casing, and connecting the circuit to a communication apparatus or any other components. In some embodiments, the water-soluble circuit will not be connected to a communication apparatus or any other components.

At step 320, the identification code is placed into a database. The database may be electronic, paper, or any other type of database. At step 330, the identification code is retrieved from the database. At step 340, the identification code is read from the device. This may be read via a communication apparatus or other device component, or it may be read using a probe. At step 350, the identification code read off the device is compared to the identification code retrieved from the database. At step 360, it is determined whether a warranty on the device is void. The warranty may be found void if the second identification code is not identical to the first identification code. This may occur if the second identification code is no identification code because the water-soluble circuit has dissolved in water. Alternatively, this may occur if the water-soluble circuit has been replaced with another circuit. One could presume that the new circuit was inserted to replace the water-soluble circuit after it had dissolved in water.

What is claimed is:

1. An electronic device comprising:
a device casing;
one or more components located within the device casing, the one or more components configured to perform the functions of the electronic device;
a water-soluble circuit located within the device casing; and
an identification code encoded on the water-soluble circuit, the identification code associated with the electronic device.

2. The device of claim 1, further comprising:
a communication apparatus connected to the circuit, the communication apparatus configured to transmit the identification code from the electronic device to an external device.

3. The device of claim 1, wherein the identification code is unique to the device.

4. The device of claim 1, wherein the identification code is a serial number for the device.

5. The device of claim 1, wherein the water-soluble circuit comprises a nonvolatile memory circuit.

6. The device of claim 3, wherein the electronic device is a mobile phone.

7. The device of claim 3, wherein the electronic device is a laptop.

8. The device of claim 3, wherein the electronic device is a tablet.

9. The device of claim 3, wherein the electronic device is an audio player.

10. The device of claim 3, wherein the electronic device is a gaming system.

11. A method for manufacturing an electronic device, the method comprising:
installing a water-soluble circuit within a casing of an electronic device that further includes one or more components configured to perform the functions of the electronic device, the water-soluble circuit encoded with an identification code, and the identification code associated with the electronic device.

12. The method of claim 11, further comprising:
encoding the identification code on the water-soluble circuit.

13. The method of claim 11, wherein the identification code is unique to the device.

14. The method of claim 11, wherein the water-soluble circuit comprises a nonvolatile memory circuit.

15. The method of claim 12, further comprising:
assembling the water-soluble circuit.

16. A method for detecting water intrusion in an electronic device, the method comprising:
installing a water-soluble circuit within a casing of an electronic device that further includes one or more components configured to perform the functions of the electronic device, the circuit encoded with a first identification code, and the first identification code associated with the electronic device; and placing the first identification code into a database.

17. The method of claim 16, further comprising:

retrieving the first identification code from the database.

18. The method of claim 16, wherein the water-soluble circuit comprises a nonvolatile memory circuit.

19. The method of claim 17, further comprising:

reading a second identification code off of the water-soluble circuit; and comparing the second identification code to the first identification code.

20. The method of claim 19, further comprising:

determining that a warranty is void, the determining based on the second identification code not identical to the first identification code.

\* \* \* \* \*